United States Patent [19]

Stone et al.

[11] Patent Number: 4,473,859
[45] Date of Patent: Sep. 25, 1984

[54] PIEZOELECTRIC CIRCUIT BREAKER

[75] Inventors: W. Porter Stone, Walpole, N.H.; Henry H. Kolm, Wayland; Eric A. Kolm, Brookline, both of Mass.

[73] Assignee: Piezo Electric Products, Inc., Cambridge, Mass.

[21] Appl. No.: 421,261

[22] Filed: Sep. 22, 1982

[51] Int. Cl.³ .................... H02H 3/00; H02H 5/04; H01H 57/00
[52] U.S. Cl. .................... 361/93; 200/181; 310/330; 361/103
[58] Field of Search .......... 310/330, 331, 332; 361/93, 103, 105, 106; 200/181; 335/151

[56] References Cited

U.S. PATENT DOCUMENTS 2,748,320 5/1956 Van Ryan ................... 361/93
4,383,195 5/1983 Kolm et al. ................. 310/330

FOREIGN PATENT DOCUMENTS 1461053 10/1966 France ..................... 335/151
421067 8/1974 U.S.S.R. ..................... 200/181

OTHER PUBLICATIONS

Beresford, Roderic "Piezoelectric Bender Actuates Tiny Relays and Dot Matrix Printers", *Electronics*, v. 54, No. 22, Nov. 3, 1981, pp. 39–40.

*Primary Examiner*—George H. Miller, Jr.
*Assistant Examiner*—Patrick W. Foster
*Attorney, Agent, or Firm*—Joseph S. Iandiorio

[57] ABSTRACT

A piezoelectric circuit breaker including: a line terminal and a load terminal; contact means interconnected between the terminals; means responsive to an increase in load current between the terminals for generating a voltage indicative of an overload current; and piezoelectric bender means responsive to the voltage for deflecting and opening the contact means.

17 Claims, 6 Drawing Figures

PIEZOELECTRIC CIRCUIT BREAKER

FIELD OF INVENTION

This invention relates to a piezoelectric circuit breaker.

BACKGROUND OF INVENTION

A number of circuit breaking devices are presently employed for protecting electrical circuits against current overloads. The fuse is the most widely used and least expensive of these devices. However, a short circuit or overload will blow the fuse and thus render it unusable. Replacement of the fuse is required after each operation. Alternatively, reusable heat-sensitive elements, such as bimetallic strips or thermistors, have been utilized as circuit breakers. Bimetallic strips bend upon overheating to directly open a current-breaking switch. Continuously acting bimetallic strips are typically used only in motors as a supplement to line protection fuses and magnetic circuit breakers. Such strips are able to withstand starting current surges without breaking, but are much too slow in operation to entirely replace the fuses or magnetic breakers. Bimetallic strips of the snap-over variety are often used as thermostats in irons, toasters, and other appliances. Such circuit breakers act rapidly but the temperature at which they break the circuit is typically imprecise. Thermistors are composed of ceramics which change their resistance abruptly at predetermined temperatures. Although useful as overload sensors, thermistors react too slowly to temperature changes to completely handle circuit breaking functions. In magnetic circuit breakers, an overload current activates an electromagnet which in turn opens a circuit breaking switch. Such devices are fast-acting. However, they are also relatively expensive and require a current surge for activation.

SUMMARY OF INVENTION

It is therefore an object of this invention to provide a piezoelectric circuit breaker which is reusable and which performs effective fast-acting circuit breaking at precise overload current levels.

It is a further object of this invention to provide a piezoelectric circuit breaker which is both reusable and relatively inexpensive.

It is a further object of this invention to provide a piezoelectric circuit breaker which guards against both sudden overload current surges and gradual buildup of overload current.

It is a further object of this invention to provide a piezoelectric circuit breaker which may be precisely adjusted both to break a circuit at a selected one of a wide variety of overload currents and to delay such breaking for a selected time following attainment of such overload current.

It is a further object of this invention to provide a piezoelectric circuit breaker which is readily incorporated into a conventional threadably insertable fuse housing and is thus usable in a standard fuse box.

This invention features a piezoelectric circuit breaker including a line terminal and a load terminal. Contact means are interconnected between the terminals. There are means responsive to an increase in load current between the terminals for generating a voltage indicative of an overload current. There are piezoelectric means responsive to the generated voltage for deflecting and opening the contacts.

In preferred embodiments, the means for generating a voltage may include a thermally responsive element. The thermally responsive element may include a first thermistor and such first thermistor may be in series between the terminals and increase in resistance with increasing temperature. A second thermistor may be disposed in thermally conductive relationship with the first thermistor and may be energized to maintain a constant temperature for the first thermistor. The line terminal may be connected with a first power line and the second thermistor may be connected between the first line and a second line. Thermally insulating means may surround the first and second thermistors.

Alternatively, the line terminal may be connected with a first power line and the means for generating a voltage may include a load resistance in series with the contact means and a thermistor connected between the first line and a second line and disposed in thermally conductive relationship with the load resistance. Preferably, in such embodiments the thermistor decreases in resistance with an increase in temperature in the load resistance. The thermistor may be connected with the second line through a voltage divider resistance for setting the circuit breaking threshold current level. Further included may be a capacitor connected across such a voltage divider resistance for setting a delay in the opening of the contact means.

Alternatively, the thermally responsive element may include a bimetallic member. In such embodiments the contact means may include one contact on the bimetallic element and one contact on the piezoelectric bender.

Means may be provided for latching the contact means in the open position effected by the piezoelectric bender. The means for latching may include spring means and such spring means may be integral with the piezoelectric bender. There may also be means for tripping such a latch to enable the contact means to close.

The invention further features a piezoelectric circuit breaker including a fuse housing for installation in a fuse receptacle and having a load terminal and a line terminal. There are contact means in the housing interconnected between the terminals. Thermal means also in the housing are responsive to an increase in load current between the terminals for generating a voltage indicative of an overload in current. Piezoelectric bender means in the housing are responsive to the voltage to deflect and to open the contact means.

DISCLOSURE OF PREFERRED EMBODIMENT

Other objects, features and advantages will occur from the following description of a preferred embodiment and the accompanying drawings, in which.

Figure 1:
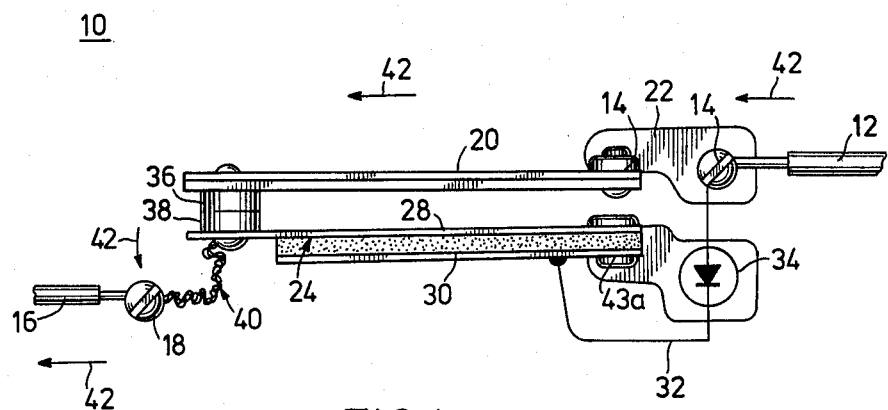
FIG. 1 is a diagrammatic view of a piezoelectric circuit breaker featuring a bimetallic bender and shown in the circuit closed condition according to this invention.

A piezoelectric circuit breaker according to this invention may be effected using line and load terminals having contact means interconnected therebetween. Solid copper or plated iron contacts of, for example, 0.25 inch in diameter, are typically used. There are means responsive to an increase in current between the terminals for generating a voltage indicative of an overload current. Piezoelectric bender means respond to the generated voltage to deflect and open the contacts.

Typically a heat responsive element, such as a bimetallic bender or thermistor responds to the increase in current. Bimetallic elements may include materials such as a copper alloy bonded to a ferrous alloy, e.g. brass to steel. In such embodiments, preferably the bimetallic bender and the piezoelectric bender each carry one of the contacts. As the overload current increases the bimetallic element heats up and bends to increase the gap, and therefore the resistance between the contacts, until a threshold voltage is generated sufficient to operate the piezoelectric bender, causing it to deflect and quickly open the contacts.

Alternatively, a first thermistor whose resistance increases with increasing temperature may be provided. As the current and thus the temperature of the thermistor increases, the resulting resistance across the thermistor increases, which gives rise to the deflecting voltage. A second thermistor may be connected between the first line and a second line and disposed in thermally conductive relationship with the first thermistor in order to stabilize the temperature of the first thermistor. Typically such thermally conductive relationship is effected by enclosing both thermistors in a common insulated casing, for example of fiberglass. In still another embodiment a load resistance connected in series with the contacts is provided in thermally conductive relationship with a thermistor connected between the first line and a second line. The thermistor is composed of a material whose resistance typically drops with increasing temperature. The heat generated by the overload current across the resistor creates a resistance drop in the thermistor, causing an increase in the voltage across the piezoelectric bender to deflect it and open the contacts. A voltage divider resistance may be connected between the thermistor and the second line for adjusting the circuit breaking threshold current. A capacitance may be included across the voltage divider for setting a delay in the opening of the contacts, thereby providing a "slow blow" breaker. Such delay may be accomplished in the bimetallic bender embodiment by adding to the mass of the bimetallic bender in order to delay bending and thus generation of the deflecting voltage.

The piezoelectric bender element typically includes a single piezoceramic wafer composed of barium titanate, lead titanate-lead zirconate, or other piezoelectric material interposed between a pair of bendable electrodes. Such single-layer piezoceramic elements, known as nonsymmetrical monolams, preferably bend in only the poling direction, i.e. away from the bimetallic bender, so as to separate the contacts. The electrode strips may include silver or other electrically conductive material such as stainless steel or bronze. Piezoelectric material is electrically polarized by being heated above its Curie temperature and then cooled below it in the presence of an electrical field.

Although nonsymmetric monolams are preferred, this invention may also be perfected using bilams, also known as bimorphs, in which layers of piezoelectric material are coated on either side of a thin strip or blade. Bending is effected by applying a voltage between the central metal blade and electrodes coated on the outer surfaces of the ceramic. Such operation is further shown in U.S. patent application Ser. No. 200,390, filed Oct. 24, 1980, entitled "Piezoelectric Actuator", by Kolm et al., and U.S. patent application Ser. No. 338,228, filed Jan. 28, 1982, entitled "Piezoelectric Relay With Magnetic Detent", by Kolm et al.

Latching means may be provided for latching the contacts in the open position effected by the piezoelectric bender. Such a latch typically includes a leaf spring or other spring means and may be integral with the piezoelectric bender.

Embodiments of the circuit breaker provided herein may be incorporated into a conventional fuse housing which is threadably insertible into a receptacle in a standard fuse box. Thus this invention provides a precise, fast-acting and reusable circuit breaker which also may be readily used in an existing fuse box.

There is shown in FIG. 1 a piezoelectric circuit breaker 10 according to this invention including line terminal 14 and load terminal 18 interconnected between power line 12 and load 16. An electrically conductive heat-sensitive bimetallic member 20 is connected to the line terminal 14 by lug 22. The piezoelectric bender element 24 includes a layer 26 of piezoceramic material interposed between metal support sheet 28, which also functions as an electrode, and electrode 30. Diode rectifier 34 is connected in line 32 between terminal 14 and electrode 30.

A pair of contacts 36, 38 are connected in the circuit to be guarded between terminals 14 and 18. Contact 36 is carried by bimetallic member 20 and contact 38 is carried by sheet 28 of piezoelectric bender 24. Flexible pigtail 40 connects contact 38 with load terminal 18.

Figure 3:
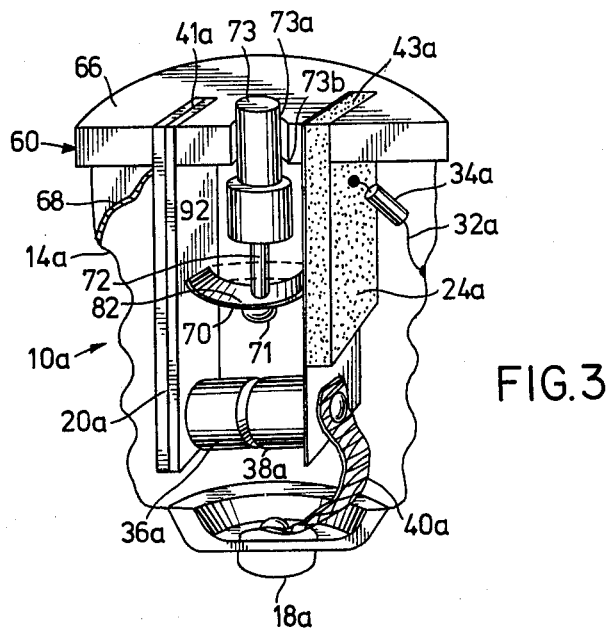
FIG. 3 is a sectional view of the piezoelectric circuit breaker of FIGS. 1 and 2 incorporated in a conventional threadably insertable fuse housing.

Ends 41, 43 of bimetallic member 20 and bender element 24, respectively, are fixed to an omitted supporting structure (such attachment is described in FIG. 3). The opposite ends of bimetallic member 20 and bender 24, i.e. the ends carrying contacts 36, 38, are not fixed and are free to move.

As illustrated in FIG. 1, under circumstances in which a normal (i.e. non-overload) current is passed through the circuit, the contacts 36, 38 are closed. Current from power line 12 passes, as indicated by arrows 42, through terminal 14, lug 22, bimetallic member 20, contacts 36 and 38, lug 40, terminal 18 and on to load 16.

Figure 2:
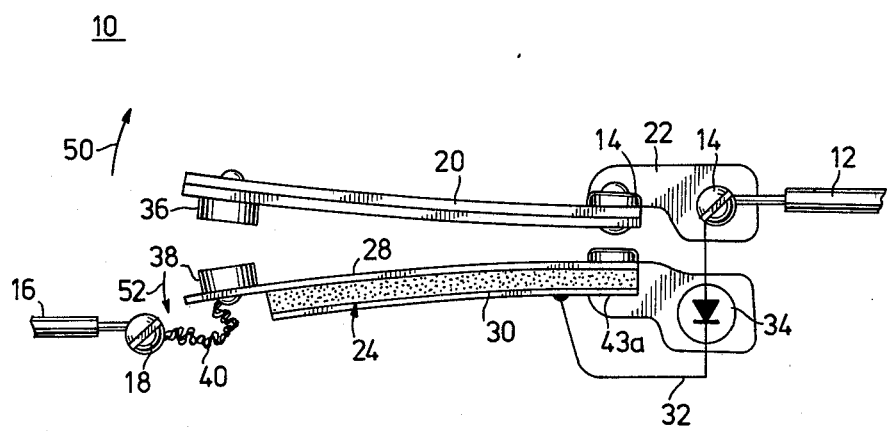
FIG. 2 is a diagrammatic view of the piezoelectric circuit breaker of FIG. 1 shown in the circuit open condition.

As shown in FIG. 2, a short circuit or current overload causes the current passing through the circuit breaker 10 to increase. The bimetallic member heats up according to the relationship $E=I^2R$. Such heating causes member 20 to gradually bend in the direction of arrow 50, thereby causing a slowly increasing gap and electrical resistance between the contacts 36, 38. A voltage is consequently generated across the contacts. This voltage is applied between terminals 14 and 18 across bender 24 via line 32 and diode 34.

Member 20 continues to bend in response to increasing temperature and the resistance and generated voltage continue to increase in response until a threshold voltage is attained which causes piezoelectric bender to snap abruptly downward in the direction of arrow 52. Contacts 36 and 38 are thereby quickly separated and the circuit is abruptly broken.

The threshold overload current required to operate the piezoelectric bender is determined by the size and composition of the piezoelectric material. For example, a bender one inch long having two layers, each 0.010 inch thick, of lead titanate-lead zirconate piezoceramic, with the two layers connected electrically in parallel, can be made to deflect by 0.025 inch upon application of 80 volts. In this manner desired overload breaking points can be specifically selected so that the instantaneous snapping action of the piezoelectric element provides for precise breaking.

Circuit breaking may also be delayed for a predetermined time. This time delay may be adjusted by adding or subtracting mass to the bimetallic member 20. As the element is made more massive a longer time period is required for it to bend the amount necessary to generate the threshold voltage.

In subsequent figures like parts have been given like numbers and similar parts like numbers accompanied by a lower case letter.

As shown in FIG. 3, circuit breaker 10a may be contained in a conventional fuse housing 60. End 41a of bimetallic member 20a and end 43a of bender 24a are fixed in insulated cap 66. The electrically conductive casing surrounding breaker 10a serves as line terminal 14a. A contact disk 18a on the bottom of the device acts as the load terminal. Under normal conditions current flows through line terminal 14a, wire 68, member 20a, closed contacts 36a, 38a, wire 40a and terminal 18a. An overload current results in the generation of voltage which deflects bender 20a. Typically, the charge in deflected piezoelectric bender 24a dissipates after several minutes. In order to prevent resultant straightening of the bender 24a and reclosing of contacts 36a, 38a, a latching leaf spring 70 is provided. Spring 70 is mounted by means of head 71 at the lower end of member 72 extending from reset button 73, having upper and lower flanges 73a and 73b which retain it in hole 74 in cap 66. When member 20a is bent and bender 24 is deflected (i.e., the overload condition) leaf spring 70 snaps into a straightened condition as shown in phantom and the ends thereof bear on member 20a and bender 24a to maintain separation of those elements even after the overload current subsides. Contacts 36a and 38a are thus latched into an open position.

After the overload has been remedied, member 20a and bender 24a attempt to straighten but are resisted by the straightened spring 70. To reset the circuit breaker 10a, reset button 73 is depressed. Member 72 pushes on midpoint 82 of spring 70 and bends it to its original position, allowing member 20 and bender 24 to come together and close contacts 36 and 38. Alternatively the piezoelectric bender may itself be mechanically bistable by containing an integral snap-spring as its metal element. That is, support sheet 28 may be a snap-action spring material. Thus, once opened by the application of a voltage, it will remain in the open position indefinitely until it is closed by the application of a mechanical force through a reset button.

Figure 4:
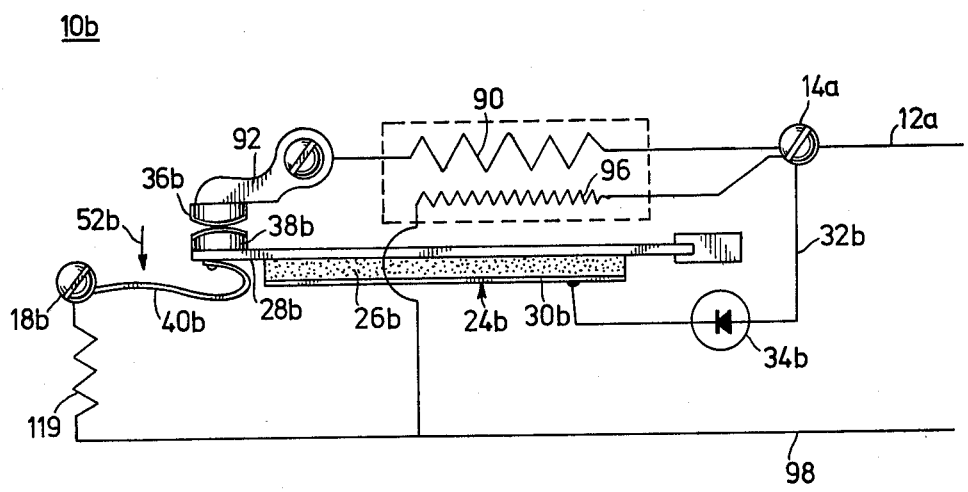
FIG. 4 is a diagrammatic view of an alternative embodiment of a piezoelectric circuit breaker according to this invention utilizing a pair of thermistors in thermally conductive relationship with each other.

In an alternative embodiment 10b, FIG. 4, a first thermistor 90 is connected in series between power line terminal 14b and load terminal 18b. Due to the composition of thermistor 90, its resistance increases as it is heated. Bender element 24b is again connected via line 32b, including diode rectifier 34b, to line terminal 14b and includes metal sheet 28b and electrode 30b and piezoceramic material 26b therebetween. Contacts 36b, 38b are connected between terminals 14b and 18b. Contact 36b is connected via lug 92 to thermistor 90, and contact 38b is carried by metal sheet 28b of bender 24b.

In operation, under normal loads current flows through terminal 14b through thermistor 90, closed contacts 36b and 38b and terminal 18b. As the current, and thus the heat generated, increase, the resistance of thermistor 90 likewise increases and a voltage is developed through resistor 119 which is provided via line 32b and diode 34b to piezoelectric bender 24b. When the desired threshold voltage (corresponding to a predetermined overload current) is reached, bender 24b abruptly snaps in the direction of 52b and the circuit is broken, placing full line voltage across bender 24b.

Resistance of thermistor 90, and thus generation of the deflecting voltage, may be affected by changes in the ambient temperature as well as by the heat generated by the overload current. Such effects are especially noticeable where thermistor 90 is used under fluctuating temperature conditions such as in outdoor applications. Extremes in ambient temperature result in inconsistent resistance and voltage generation for a particular overload current, and thus result in imprecise operation of the circuit breaker 10a. To minimize these ambient temperature effects, a second thermistor 96 is connected between terminal 14b and a second line 98. Thermistors 90 and 96 are both enclosed in a thermally insulated casing 100. Thermistor 96 draws a small current in order to generate heat, which retains thermistor 90 at a stabilized temperature, for example 100 degrees F., regardless of the ambient temperature. The temperature change experienced by thermistor 90, and thus the deflecting voltage generated thereby, will thus be the product solely of the heating from the overload current flow. Uniform operation of circuit breaker 10a is thus enabled.

Figure 5:
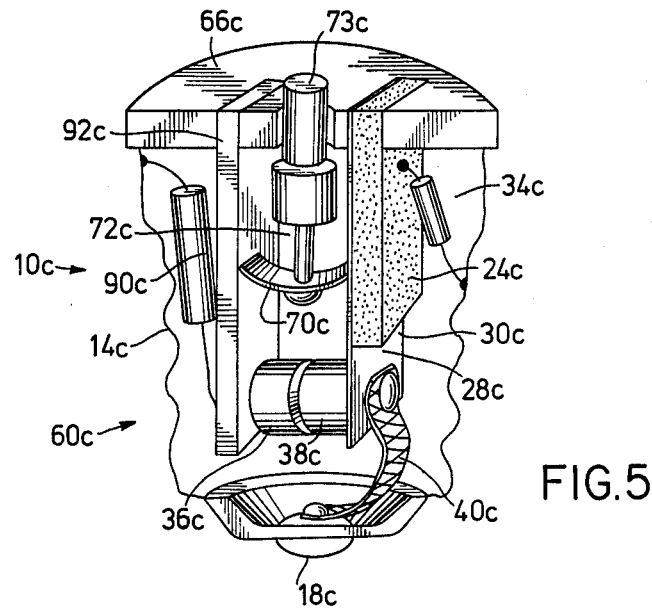
FIG. 5 is a sectional view of the piezoelectric circuit breaker of FIG. 4, without the second thermistor, incorporated into a conventional threadably insertible fuse housing.

As shown in FIG. 5, the circuit breaker 10c may be incorporated in a conventional fuse housing 60c. Metal sheet 28c of bender 24c is fixed in the insulated cap 66c and lug 92c carrying contact 36c is likewise fixed in cap 66c. Thermistor 90c is connected between the threaded metallic casing of housing 60c, which serves as terminal 14c and the contact 36c mounted on lug 92c. For clarity the second thermistor and thermally insulated casing have been omitted. Diode 34c is connected between the line terminal casing 14c and the outer surface of bender 24c. Contact 38c is connected to load terminal 18c via wire 40c.

Leaf spring 70c is connected at the base of a member 72c extending from reset button 73c. As in the prior embodiment utilizing the bimetallic element, leaf spring 70c acts as a latch. When bender 24c is deflected so that contacts 36c, 38c are open, spring 70c opens to maintain separation of member 92c and bender 24c. The contacts 36c, 38c are closed as before by depressing button 73c to bend leaf spring 70c.

Figure 6:
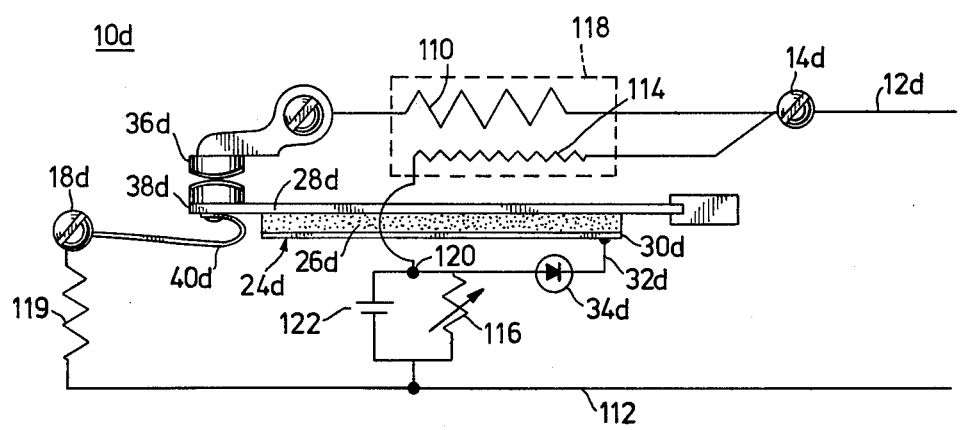
FIG. 6 is a diagrammatic view of an alternative embodiment of the piezoelectric circuit breaker of this invention utilizing a load resistance, a thermistor, and a voltage divider RC circuit.

In the embodiment 10d shown in FIG. 6, a shunt resistor 110 is connected in series with contacts 36d, 38d between line terminal 14d and load terminal 18d. Connected in series between terminal 14d and second line 112 are resistor 119, thermistor 114, having a resistance which decreases with increasing temperature, and a voltage divider resistor 116. Thermistor 114 and resistor 110 are both enclosed in insulated casing 118 and thus maintain a thermally conductive relationship.

In the normal current situation, a circuit is established through terminal 14d, resistor 110, contacts 36d and 38d, wire 40d, and terminal 18d to the load. In an overload condition the resistance of thermistor 114 decreases. The voltage at a point 120 increases as does the voltage applied to electrode 30d of piezoelectric bender 24d. When the voltage across piezoelectric layer 26d increases sufficiently, bender 24d deflects and opens contacts 36d, 38d. The voltage at terminal 120 may be adjusted by adjusting resistor 116. In this manner the threshold voltage necessary to deflect bender element 24d may be obtained at varying temperatures, i.e. varying overload currents. For example, when the voltage at terminal 120 is reduced by means of adjusting resistor 116, greater heat generation across resistor 110 is required in order to produce a resistance drop across thermistor 114 of a level sufficient to provide the required threshold voltage at terminal 120 for deflecting bender 24d. In other words, a higher overload current threshold will be required in order for circuit breaker 10d to operate. Thus it can be seen that the precise current at which the circuit is to be broken may be selected by adjusting the voltage at terminal 120 by means of voltage divider resistor 116.

Capacitor 122 connected across resistor 116 delays terminal 120 from attaining the threshold voltage required to deflect bender element 24d. As the capacitance (i.e., size or separation of the plates) of capacitor 122 increases, the introduced delay increases. In this manner circuit breaking may be delayed until the overload current has passed through the circuit for a desired length of time.

Other embodiments will occur to those skilled in the art and are within the following claims:

What is claimed is:

1. A piezoelectric circuit breaker comprising:
a line terminal and a load terminal;
contact means interconnected between said terminals;
thermal means, responsive to an increase in load current between said terminals, for generating a voltage indicative of an overload current; and
piezoelectric bender means responsive to said voltage for deflecting and opening said contact means.

2. A piezoelectric circuit breaker comprising:
a fuse housing for installation in a fuse receptacle and having a load terminal and a line terminal;
contact means in said housing interconnected between said terminals;
thermal means in said housing, responsive to an increase in load current between said terminals, for generating a voltage indicative of an overload current; and
piezoelectric bender means in said housing responsive to said voltage for deflecting and opening said contact means.

3. The piezoelectric circuit breaker of claim 1 in which said means for generating a voltage includes a thermally responsive element.

4. The piezoelectric circuit breaker of claim 3 in which said thermally responsive element includes a first thermistor.

5. The piezoelectric circuit breaker of claim 4 in which said first thermistor is in series between said terminals and increases in resistance with increasing temperature.

6. The piezoelectric circuit breaker of claim 3 in which said thermally responsive element includes a bimetallic member, and said contact means includes one contact on said bimetallic member and one contact on said piezoelectric bender.

7. The piezoelectric circuit breaker of claim 4 further including a second thermistor disposed in thermally conductive relationship with said first thermistor and in which said second thermistor is energized to maintain a constant temperature.

8. The piezoelectric circuit breaker of claim 7 in which said line terminal is connected with a first power line and said second thermistor is connected between said first line and a second line.

9. The piezoelectric circuit breaker of claim 7 further including thermal insulation means surrounding said first and second thermistors.

10. The piezoelectric circuit breaker of claim 3 in which said line terminal is connected with a first power line and said means for generating a voltage includes a load resistance in series with said contact means and a thermistor connected between said first line and a second line and disposed in thermally conductive relationship with said load resistance.

11. The piezoelectric circuit breaker of claim 10 in which said thermistor decreases in resistance with an increase in temperature.

12. The piezoelectric circuit breaker of claim 11 in which said thermistor is connected with said second line through a voltage divider resistance for setting the circuit breaking threshold current level.

13. The piezoelectric circuit breaker of claim 13 further including a capacitance connected across said voltage divider resistance for setting the delay between attainment of the threshold current level and the opening of said contact means.

14. The piezoelectric circuit breaker of claim 1 further including means for latching said contact means in the open position effected by said piezoelectric bender.

15. The piezoelectric circuit breaker of claim 14 further including means for tripping said latch to enable said contact means to close.

16. The piezoelectric circuit breaker of claim 14 in which said means for latching includes spring means.

17. The piezolectric circuit breaker of claim 16 in which said spring means are integral with said bender element.

* * * * *